(12) United States Patent
Bobst

(10) Patent No.: US 6,944,448 B1
(45) Date of Patent: Sep. 13, 2005

(54) METHOD FOR THE AUTOMATED ANALYSIS OF A MOBILE RADIO TELEPHONE SYSTEM

(75) Inventor: Hanspeter Bobst, Oensingen (CH)

(73) Assignee: Ascom (Schweiz) AG, Bern (CH)

( * ) Notice: Subject to any disclaimer, the term of this patent is extended or adjusted under 35 U.S.C. 154(b) by 486 days.

(21) Appl. No.: 10/069,406

(22) PCT Filed: Jul. 11, 2000

(86) PCT No.: PCT/CH00/00376

§ 371 (c)(1),
(2), (4) Date: Apr. 3, 2002

(87) PCT Pub. No.: WO01/17299

PCT Pub. Date: Mar. 8, 2001

(30) Foreign Application Priority Data

Aug. 26, 1999 (EP) .................................. 99810766

(51) Int. Cl.⁷ .............................................. H04Q 7/20
(52) U.S. Cl. ...................................... 455/424; 455/423
(58) Field of Search ................................ 455/423, 424, 455/425, 67.11, 67.13, 67.14, 67.7, 446; 379/1.01, 9.04, 10.01, 21, 26.01, 27.04, 32.01

(56) References Cited

U.S. PATENT DOCUMENTS

| 5,023,900 | A | * | 6/1991 | Tayloe et al. ............. 379/32.01 |
| 5,425,076 | A | * | 6/1995 | Knippelmier ............. 379/27.04 |
| 5,481,588 | A | | 1/1996 | Rickli et al. |
| 5,490,204 | A | | 2/1996 | Gulledge |
| 5,913,162 | A | * | 6/1999 | Gourdin et al. ............. 455/424 |
| 5,920,607 | A | * | 7/1999 | Berg ......................... 379/1.01 |
| 5,940,471 | A | * | 8/1999 | Homayoun .............. 379/10.03 |

FOREIGN PATENT DOCUMENTS

| WO | 93 15569 A | 8/1993 |
| WO | 93 15591 A | 8/1993 |

* cited by examiner

*Primary Examiner*—Vivian Chin
*Assistant Examiner*—Raymond B. Persino
(74) *Attorney, Agent, or Firm*—Birch, Stewart, Kolasch, & Birch, LLP

(57) ABSTRACT

The invention relates to a method for the automated analysis and appraisal of a mobile radio telephone system (1). Said method scans calls that are executed as part of a test phase, in accordance with internal and external system parameter values which flag error conditions (e.g. handover errors) or system performance deficiencies (e.g. poor voice quality during transmission). In a subsequent step, the parameters are evaluated in several modules (12.1–12.3) according to selectable grouping criteria, whereby for each module a multitude of relevant events or event sequences are examined and a module quality value (17.1–17.3) is determined with regard to a specific appraisal criterion. The system quality value (20) of the entire system is calculated as a weighted sum of the quality values from the individual modules and can be displayed graphically as a comparison of all groups, with regard to the chosen grouping criterion.

12 Claims, 3 Drawing Sheets

METHOD FOR THE AUTOMATED ANALYSIS OF A MOBILE RADIO TELEPHONE SYSTEM

This application is the national phase under 35 U.S.C. § 371 of PCT International Application No. PCT/CH00/00376 which has an International filing date of Jul. 11, 2000, which designated the United States of America.

TECHNICAL FIELD

The invention relates to a method for the automated analysis of a mobile radio telephone system, in which method a multiplicity of test connections are established between two terminals, particularly a mobile terminal and a stationary or mobile terminal, as part of a test phase, and a plurality of protocol parameter values are acquired during the test phase.

PRIOR ART

The providers of mobile telecommunication are increasingly exposed to competition. There is a corresponding need to control and, if possible, to improve the quality of their own mobile radio telephone system. On the one hand, this involves opening up new geographic regions as efficiently as possible (i.e. at low cost but with area-wide coverage) in order to increase the potential of interested parties in this way. On the other hand, the existing customers should be kept by means of high quality of the network.

From the point of view of the user, the quality of the mobile radio telephone system is judged on the transmission quality of the voice, the availability of the network access, the frequency of call interruptions etc., i.e. the user wishes to be able to telephone at any time and to have a good and uninterrupted connection independently of his location and the duration of the call.

Mobile radio telephone systems are highly complex technically. Their performance depends on boundary conditions which vary with time and in some cases can only be calculated with difficulty or not at all. In addition, a mobile radio telephone system must be continually adapted to the current needs (e.g. by integrating more base stations). Faults and weak points in the system must be localized step by step and the causes must be eliminated. However, the operator of the mobile radio telephone system cannot rely on the reports from the subscribers. They will scarcely take the trouble to point out possible weak points to the system operator in a consistent and logical manner. Even if the operator were to be informed in this way, these reports would only in exceptional cases be suitable for locating a system fault. There would be too little information available about the system state which could have caused the fault which led to the complaint.

Today, system analysis and optimization must be performed in painstaking and detailed work by experts. The problem is that errors in system programming, malfunctions of the hardware and design faults in the network planning have effects on the subjectively perceived network quality which are difficult to predict.

In the known manual analysis, many test connections are established and assessed with respect to quality. To be able to locate any disturbances in the system, protocol data are recorded and stored. Such test runs are performed periodically in most cases. The test duration can be selected arbitrarily and thus an enormous effort must be made not only in collecting the test data but also in evaluating the collected data.

If it is considered that typically far more than 100 protocol values are produced per second, it becomes clear how much effort is required to check all these values manually and to locate possible system faults (which—as already mentioned—are not necessarily apparent directly from the protocol values). There is no question of a systematic system analysis.

In WO 93/15591, a method for planning a cellular radio telephone network is described. The planning is done on the basis of a model of the radio environment and of a simulation of the system. The aim of the simulation is to generate the data required for the subsequent analysis. It should also be possible to apply the optimization of the system parameters to existing systems and the parameters are then measured. As part of the evaluation, individual parameters are graphically displayed on a screen as a function of other parameters.

DESCRIPTION OF THE INVENTION

It is the object of the invention to specify a method of the type initially mentioned which provides for the automated analysis and assessment of the quality of a mobile radio telephone system.

The features of claim 1 define how this object is achieved. The method accordingly comprises the following steps:

a) A multiplicity of test connections is established between two terminals (particularly a mobile terminal and a stationary terminal or two mobile terminals) with the aid of a test and measuring device as part of a test phase. In this context, a test connection is considered to be established not only when it is set up and dropped again (properly or due to faults) but also if it is not established in spite of an attempt (is unsuccessful, as it were).

b) During the test phase, the values of a plurality of protocol parameters internal and external to the system are acquired and recorded. For example, the parameter values of the various system units are acquired separately during the data acquisition. System units are understood to be functional units (hardware components or also program units) of the mobile radio telephone system and of the measuring device (e.g. various layers in the terminals, switching units and other components of the base stations, etc.).

c) From these protocol parameter values, records are generated which are stored in real time or off-line in a database. The database has a suitable structure so that it is possible to search for all protocol parameter values selected in the sense of the subsequent method steps.

d) The protocol parameters are evaluated in each case separately with regard to a certain assessment criterion with a separate module, the number of such modules being greater than or equal to one and freely selectable. In most cases, a number of such modules is provided. These assessment criteria can be, for example, the type of call end, the speech quality or the degree of coverage in the coverage area. The corresponding evaluation modules for the assessment criteria mentioned are then called, e.g., "call end analysis", "speech quality analysis" and "coverage analysis".

e) Each module calculates a quality value—the module quality value—of the mobile radio telephone system. For this purpose, a further quality value—the event quality value—is determined for a number of event types which are of significance for this assessment criterion. The number of events taken into consideration per module and also the number of parameters taken into consideration per event is at least one, but can be expanded arbitrarily. The module quality value is then calculated as the mean value of the various event quality values.

f) To obtain a quality value for the overall system, a system quality value is calculated from the various module quality values. It then becomes possible to subject the system to an accurate analysis in order to analyze and to assess, for example, the speech quality of the mobile radio telephone system.

The core of the invention lies in the fact that the quality of various parts and subsystems of the mobile radio telephone system is systematically determined. Systematically here means that a predetermined list of parameters and parameter sequences to be tested is completely processed. However, it means not only the quality of individual parameter values which are not within the prescribed interval and may not even lead to a fault but also that of entire system sequences, situations or circumstances which could result in system errors.

The essential advantage of the invention lies in the combination of systems and speed of analysis. Due to the enormous volume of data, technical experts would not only look for weeks but would also frequently become stuck because the search system cannot be guaranteed or only with disproportionately great expenditure.

Moreover, in contrast to the prior art, it is not only individual parameter values which are examined for correctness in the invention but entire sequences and the behavior of entire system parts or components can be analyzed. This makes it possible to better detect relationships and if possible to intervene more rapidly and more selectively. The system analysis is of modular configuration which makes the method extremely flexible and allows the system to be examined and to be assessed in every detail. If it is required, the system analysis can also be followed by an automated fault correction, naturally.

The internal system protocol parameters mainly consist of signaling messages which occur in the terminals or in the network (e.g. data which are generated by the existing control hardware or software of the system during a call and are used for controlling and monitoring the communication link). The external system protocol parameters are mainly information which is typically determined periodically or, if required, also by means of separate measuring and analysis methods in the terminals or distributed in the network (such as, e.g., data for assessing the quality of the connection, boundary information data on location, time, speed etc. of the mobile terminal).

Each record thus determined is provided with a time stamp and allocated to a particular group of data on the basis of a grouping criterion (in most cases allocated to a protocol parameter). A grouping criterion can be, e.g., the base station, the geographic position (e.g. at 100 m), the frequency channel or also the network operator. The data are stored in a database having a suitable structure.

The time stamp of the actual data acquisition and preferably another parameter, the identifier of the connection, are used for synchronizing the data when they are input into the database. (The identifier is of importance especially if, in addition to the test connections, other user connections are also running via a particular unit, e.g. via a base station.)

In a preprocessing step, the records can already be grouped in accordance with a required grouping criterion as far as possible so that they can be processed better and more rapidly later. At the same time, the data reduction can also be performed.

Firstly, at least one event table per module is generated from the records stored in the database by searching the database for predetermined protocol parameter values or for certain combinations of protocol parameter values which signal a predefined event. The corresponding records (or, respectively, the protocol parameters contained in them) are then stored wholly or partially in the event tables.

For each event thus found, the exact time is determined at which it has taken place. After that, a selectable or predefined leading and/or trailing time is determined before or after the event, respectively, which identifies the period within which other relevant events are located which influence the event found or can be influenced by it.

The relevant data of the relevant events located within this leading or trailing time are also picked out of the database and are entered in the event table together with the data of the events found. Each event found is classified by means of these data. The events are classified because an event X which proceeds, e.g., event A is "normal" whereas event X which is preceded by event B characterizes a fault and, accordingly, must be processed differently.

Once the events have been allocated to the respective classes, a quality value—the event quality value—is determined for each possible event type or event type which has occurred within the observation period.

a) For this purpose, a numerical value is firstly allocated to each possible signaling message or sequence. This mapping of the messages into the numerical domain takes place in order to obtain a possibility for quantitative assessment of the circumstances before and after a certain event.

b) After that, an average record is calculated from the records of all events with the same classification and from these numerical values, in each case forming the mean value of the same protocol parameters of each data record or, respectively, of the numerical values for the signaling sequences.

c) Using these mean values as components, an event vector is formed for each possible event type (if at least one event of this type has occurred).

d) The event quality value is now determined by scalar multiplication of the event vector of a certain event type by a weighting vector which corresponds to the event type, i.e. is event-specific. This weighting vector is necessary since not all protocol parameters of the event vector have the same amount of influence or the same degree of significance for this event type. The sum of the weighting factors of the individual event weighting vectors is preferably equal to one so that, at the same time, a certain normalization can also be achieved.

Finally, a system quality value with respect to a selectable grouping criterion is also calculated from the individual module quality values. For this purpose, a quality vector is formed, the components of which are the module quality values of the individual modules.

The system quality value is now calculated as the scalar product of this vector by a module weighting vector which weights the individual modules in dependence on the selected grouping criterion. The sum of the components of the module weighting vector is one which also makes it possible to achieve a normalization of the system quality value. This produces a system quality value for each possible value of the grouping criterion, i.e. exactly one system quality value for each base station, each geographic position, each frequency channel or each network operator.

It is thus possible to perform an evaluation of the acquired data which is flexible, conforms to detail and has any degree of accuracy by suitably selecting the event-specific vectors and the module weighting vectors. For example, it is possible to analyze the speech qualities of the connections of a particular base station in dependence on the terminal position or in dependence on the frequency channel used.

After the automated analysis of the mobile radio telephone system, the system quality values thus calculated can also be used for assessment of this system by a system engineer. To be able to perform the assessment as simply as possible, these values are preferably displayed graphically, for example as a histogram. In a diagram, the possible elements of the selected grouping criterion (e.g. all base stations) are plotted along the x axis and the corresponding system quality values are plotted along the y axis. The elements can be arbitrarily sorted in accordance with quality value or, for example in the case of frequency channels, simply in ascending or descending order of the channel number. Diagrams with more than two dimensions can also be advantageous, however. For example, a three-dimensional diagram in the assessment of quality with regard to the geographic position as group criterion. Instead of displaying the individual measurement positions along a single axis (e.g. with the aid of a number), two of the three dimensions of the diagram are simply used for displaying the measurement positions at their correct positions. The system quality values are then displayed in the third dimension which conveys a three-dimensional impression of the system quality in the coverage area in a simple manner.

To be able to perform a more accurate system analysis, the system quality values are related to one another with respect to various grouping criteria. For this purpose, for example, the same events of a certain class can be grouped in accordance with different grouping criteria and then evaluated in accordance with the invention.

The external system parameters acquired are preferably the speech quality, the duration for establishing the connection, location, time, speed and direction of travel of the mobile station. The speech quality can be assessed in that a predetermined voice signal (e.g. a sentence spoken in various languages and/or with various voices) is transmitted and analyzed at the receiving end with the aid of a neuron network (compare e.g. EP-0 644 674 A2).

The method according to the invention is performed in a real environment by means of an analysis arrangement in a conventional mobile radio telephone system. This comprises a public mobile radio telephone network and a plurality of terminals between which both normal telephone connections and test connections can be set up and ended again. Furthermore, at least one measuring device is provided by means of which the required protocol parameters can be acquired by measurement or by recording system messages, there being typically a number of such measuring devices. The parameters acquired are forwarded to an evaluating device which comprises a specifically structured database and an evaluating unit. The parameters are suitably stored in the database and after that analyzed by the evaluating unit with a plurality of modules in accordance with the method according to the invention and from this a system quality value is calculated. The time of transmission of the acquired data from the measuring devices to the evaluating device, and of the evaluation of the stored data, is open. Both can be done both in real time and off-line at a later time.

According to the invention, the evaluation of the data acquired can also take place separately from the data acquisition. For this purpose, an evaluating device is used by means of which data previously acquired can be imported. These data include, e.g., data acquired externally, i.e. measured and recorded at other locations, internal and/or external system protocol parameters of an arbitrary mobile radio telephone system. These data already exist as records of selected protocol parameters or the records are formed by the evaluating device and stored in a suitably structured database. The records stored in the database are evaluated in accordance with the invention as described above.

To be able to perform the analysis of the mobile radio telephone system more and more precisely, additional parameters can be acquired and/or stored, new grouping criteria, events or event classes can be defined, other lead and lag times can be specified, other event vectors formed, the event-specific and/or the module weighting vectors can be changed or additional or, respectively, other evaluation graphics can be generated as required. Thus, the efficiency of the method according to the invention can be increased further with time.

Further advantageous embodiments and combinations of features of the invention can be obtained from the detailed description below and from the totality of patent claims.

BRIEF DESCRIPTION OF THE DRAWINGS

The drawings used for explaining the exemplary embodiment show in.

In principle, identical parts are provided with identical reference symbols in the figures.

Approaches to Carrying Out the Invention

The exemplary embodiment described in the text which follows can be interpreted as a multistage method:

At the beginning, the test connections are set up and the protocol parameters are acquired. In addition, the data are entered into a relational database and grouped in accordance with various grouping criteria in a preprocessing step.

In a first step, the events of interest are picked out of the data, classified by means of the respective prior and subsequent history and assessed in accordance with the required evaluation. The events are processed in a number of modules which in each case determine the system quality with respect to a particular criterion.

In a second step, a module quality value which reproduces the system quality with respect to the corresponding criterion is calculated from the events assessed per module.

In a third step, a measure of the entire system quality with regard to the selected grouping criterion is determined from the module quality values.

In further steps, the system analysis is evaluated with respect to the selected grouping criterion in that the system quality of the corresponding groups can be graphically displayed and thus compared with one another in a simple manner.

Figure 1:
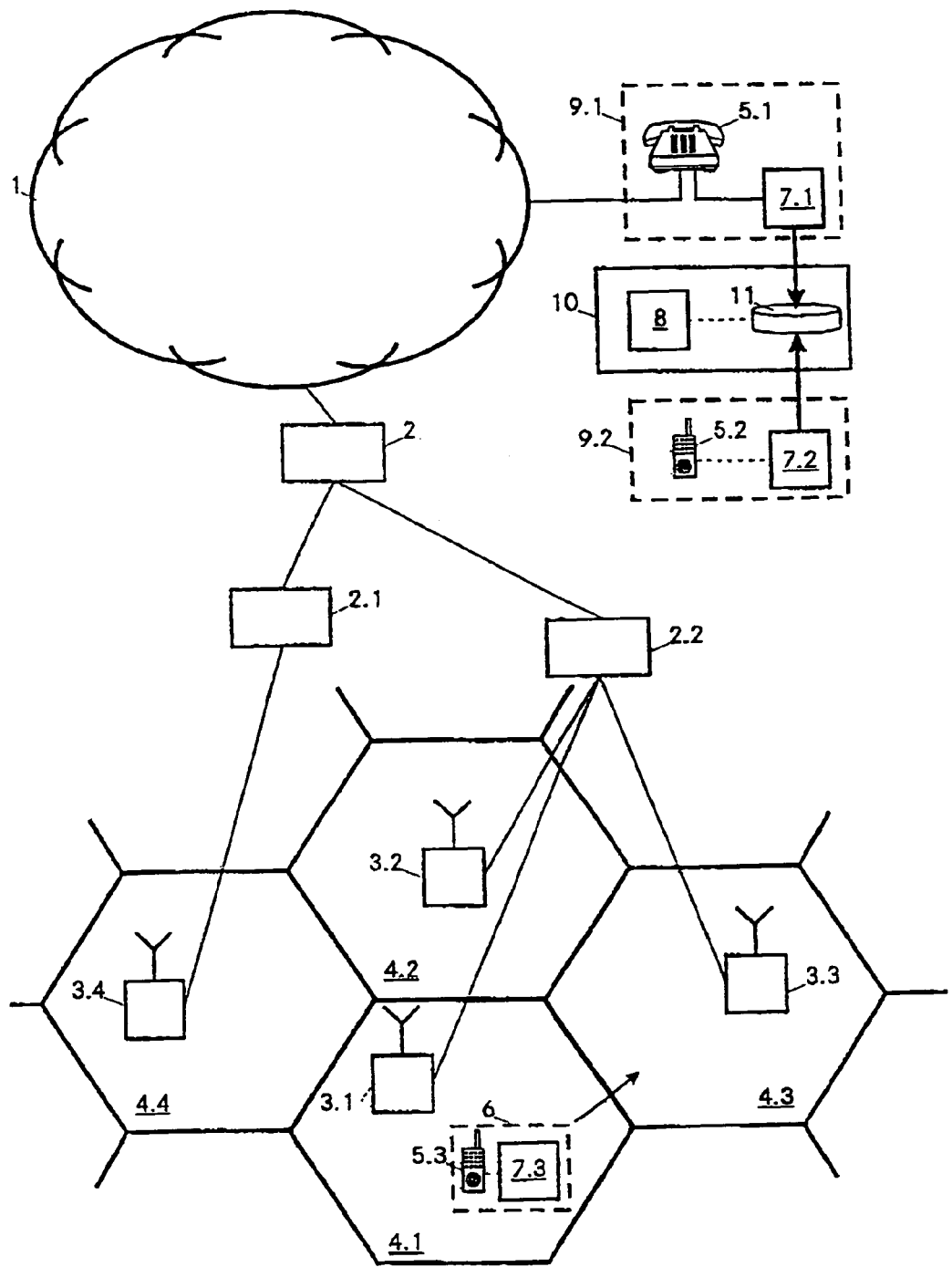
FIG. 1 a diagrammatic representation of a mobile radio telephone system and an arrangement for checking it.

The object of the automatic analysis according to the invention is a mobile radio telephone system of a type of design known per se. FIG. 1 symbolically shows a mobile switching center 2 (MSC) and four base stations 3.1 to 3.4 (antennas). The base stations 3.1 to 3.4 are controlled, e.g., by two base station controllers 2.1, 2.2 (BSC) and supply cells 4.1 to 4.4. The mobile radio telephone system is connected, for example, to a public network 1 (PSTN). Thus, calls can be made in the usual manner between a stationary terminal 5.1 or a mobile terminal 5.2, respectively, and a mobile station 6.

As a rule, it is very difficult to systematically measure and assess the quality of a mobile radio telephone system. Due to the fact that the mobile station is continuously moving, the state of the mobile radio telephone system is also changing. This takes place, however, not continuously but abruptly in some cases (e.g. during a handover due to a change to another base station).

On the market, specific measuring devices are already available which allow calls to be set up automatically and the quality of the connection to be measured (compare e.g. Ascom Infrasys AG, CH-4503 Solothurn, Switzerland "ascom Qvoice, The Most Advanced Cellular Network Quality Measurement System"). Although these known measuring systems acquire a large volume of data, they do not, however, provide the operator with a possibility for automated analysis and quality assessment.

Figure 2:
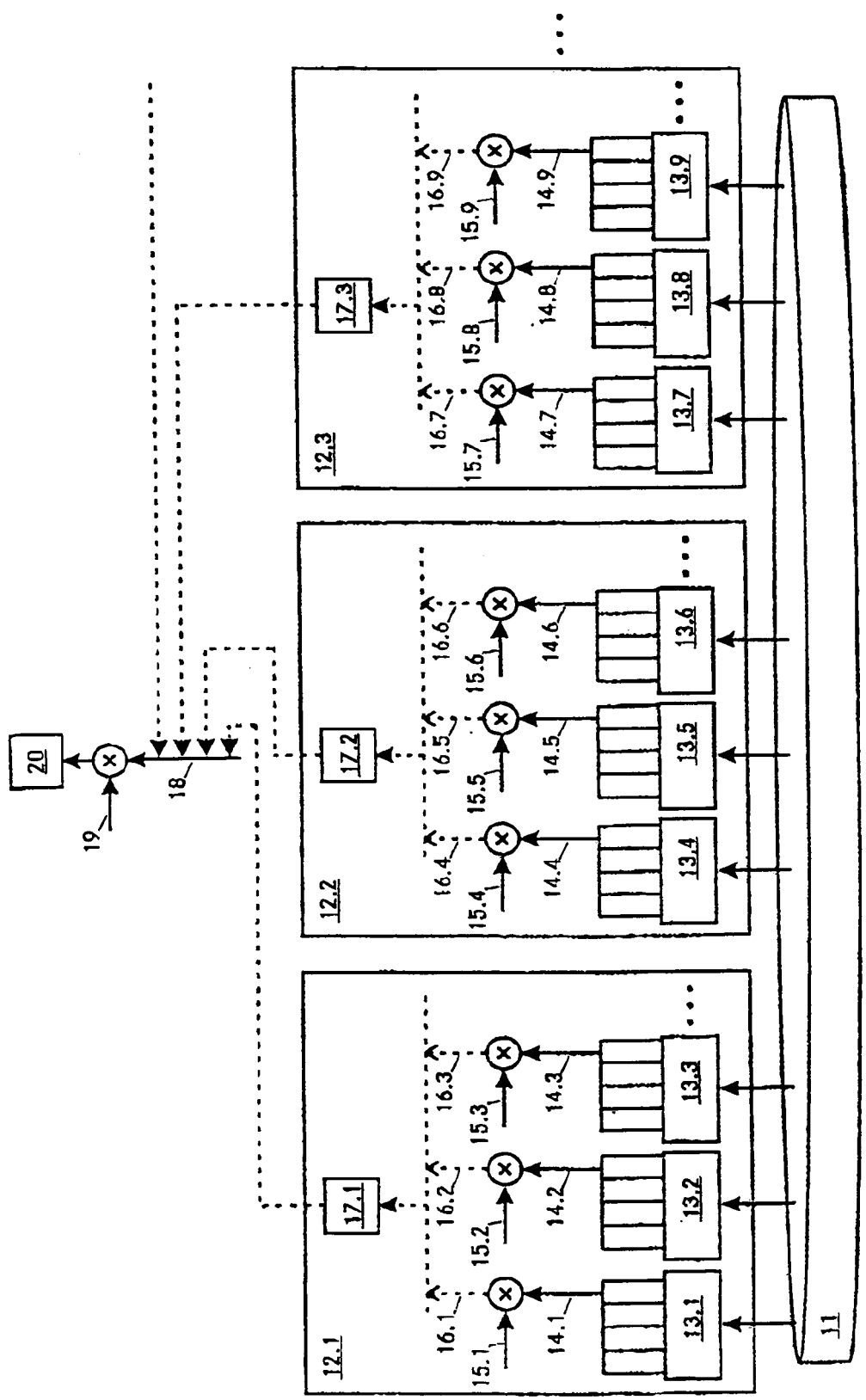
FIG. 2 a block diagram for explaining the method according to the invention.

The method according to the invention goes one step further in this case. The essential steps will be explained in greater detail with reference to FIGS. 1 and 2.

As part of a test phase, a large number of test connections are set up in succession and alternately between a stationary unit 9.1 (which comprises a first measuring device 7.1 and a conventional circuit of a terminal 5.1) and a mobile station 6 (which contains a second measuring device 7.3 with a mobile radio telephone circuit 5.3) or between a mobile unit 9.2 (which comprises a third measuring device 7.2 and a conventional circuit of a mobile terminal 5.2) and the mobile station 6. In real terms, this means that, e.g., the mobile station 6 dials the number of the terminal 5.1 or 5.2, a check is made whether the connection has been set up and after what time, that the speech quality is measured and that, finally, the call is correctly terminated. The procedure is also carried out in the reverse direction, i.e. from unit 9.1 or unit 9.2 to the mobile station 6. Several hundred connections are preferably set up, dropped and measured by the measuring devices 7.1 to 7.3, for example.

During this process, the mobile station is driven all over the area of the mobile radio telephone system to be tested.

Each of these calls is logged. I.e., all internal states of the mobile radio telephone system are stored, if possible, on the one hand and, on the other hand, various external system parameters are also acquired. The states of the mobile radio telephone system are determined by internal system protocol parameters. These parameters exist in every mobile radio telephone system (compare GSM Recommendation 04.08). Examples of these are:

Radio channel parameter (frequency, signal level etc.)
Call control parameters
Mobility management parameters (routing, handover parameters etc.)

It is not only the protocol parameters occurring in the terminals (e.g. GSM protocols of various layers) which are acquired but also those generated within the system, e.g. the protocols running in the base stations or controllers, respectively.

External system protocol parameters are those which are not generated by the mobile radio telephone system itself such as, e.g.:

Coordination parameters (location, time, speed, direction etc. of the mobile station),
Quality parameters (duration of the call set-up, unsuccessful call set-up, quality of the speech signals transmitted during the call, particular disturbances etc.),
Control information (e.g. time of the signal which causes the terminal to dial a particular connection).

It must be noted that protocol parameters are always related to an instantaneous operating state. They can change their values in part during a call or from one call to the next.

From the protocol parameters mentioned, records related to the individual functional units are generated and provided with a time stamp. During the test phase, the records can be stored, for example locally, in the order in which they are generated. However, it is also possible to transmit the records directly to a processing station 10 where they are entered in a database 11 and are correlated with one another. For this purpose, various tables which list the data blocks or records in accordance with predetermined grouping criteria are generated in a preprocessing step. Thus, the records can be listed, for example in chronological order (with additional specification of the type of data, the identification number of the call etc.). Advantageously, a number of lists are provided in accordance with the search functions to be applied later. For example, the data blocks can be sorted in accordance with the geographic location of the mobile station.

Next, the parameter values stored in the database 11 are processed and analyzed in the processing unit 8.

This is done in various modules 12.1 to 12.3. Each module 12.1 to 12.3 evaluates the data with regard to a certain assessment criterion. Examples of these are:

Call End,
Speech Quality,
Coverage,
Timing,
Handover,
Data Service.

For this purpose, a plurality of event tables 13.1 to 13.9 are generated by searching in the presorted lists for certain events relevant to the respective assessment criterion. These events are identified by searching for certain individual or particular combinations of protocol parameter values and storing the corresponding records in the event tables 13.1 to 13.9.

Such an event is, e.g., a connection release, regular or premature. A connection release can be detected, e.g., with the aid of the internal system protocol parameters. In a mobile radio telephone system there are flags which provide information in this regard. However, there are also external system protocol parameters which make it possible to detect a connection release (e.g. corresponding or missing response signals from the other subscriber station).

A handover can also be called an event, for example.

In the combined search, the object is in most cases unusual combinations of parameter values which may point to a weakness in the system performance (e.g. a high signal level in combination with a high bit error rate). In the next step, the accurate time at which it has taken place is determined for each event found. After that, further events which may be of significance for the event found, e.g. can influence it or can be influenced by it, are searched for within a particular leading and trailing time. Relevant data of these events, too, are stored in the event tables 13.1 to 13.9.

Using the stored data, e.g. the order and the parameter values of the events within the leading and trailing time of a particular event, the latter is then classified, i.e. allocated to one of several possible types of event. This provides a number of event types which in each case have occurred more or less frequently within the observation interval.

With regard to the grouping criterion selected or to be evaluated, respectively, there is for each of these event types a certain selection of relevant protocol parameters and a certain event weighting vector 15.1 to 15.9 by means of which a more or less great significance can be given to the individual parameter values.

The mean value of each protocol parameter of this selection is then formed so that, at the end, the result is exactly one average record 14.1 to 14.9 per event type. Each value of this average record 14.1 to 14.9 is thus equal to the average of all corresponding values of the event records of a particular event type.

The further processing in the individual modules 12.1 to 12.3 is performed by formation of a vector from the average records 14.1 to 14.9 and scalar multiplication by the corresponding event weighting vector 15.1 to 15.9. The result is one event quality value 16.1 to 16.9 each per event type examined.

Finally, to determine the module quality value 17.1 to 17.3 of the individual modules, the mean value of all event quality values 16.1 to 16.3 for module 12.1, 16.4 to 16.6 for module 12.2 and 16.7 to 16.9 for module 12.3, calculated in this module, is simply calculated.

Lastly, the system quality value 20 is calculated. For this purpose, a module quality vector 18 is formed from the individual module quality values 17.1 to 17.3 and is then subjected to a scalar multiplication by a module weighting vector 19.

Instead of calculating the average records 14.1 to 14.9 or, respectively, the module quality values 17.1 to 17.3 as mean values of the individual event records or, respectively, the event quality values 16.1 to 16.9 in each case, these could naturally also be calculated as a weighted sum (similarly to the scalar product in the calculation of the event quality values 16.1 to 16.9 and of the system quality value 20) and the sum of the respective weighting factors could also be selected equal to one in each case.

In the text which follows, greatly simplified examples will illustrate the above general statements. It is assumed in each case that the phase of data acquisition and the preprocessing is already concluded. Thus, the data must be analyzed and represented in the required manner so that a system engineer can interpret them in a simple manner. In addition, he should be able to refine his analysis until he has reached the required depth of detail.

The mobile radio telephone system is analyzed automatically after the system engineer has told the system (e.g. by selecting a menu point on a computer screen) which evaluation, i.e. which quality values with respect to which grouping criteria and with which weighting vectors, he would like to see. The system first determines the weighting factors corresponding to the evaluation, then performs the analysis automatically and displays the required evaluation graphically on the screen.

Figure 3:
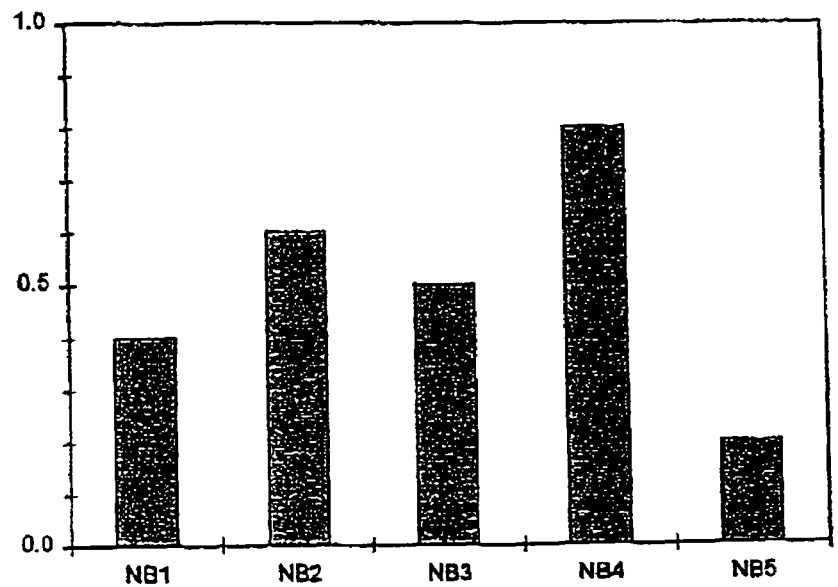
FIG. 3 a diagrammatic, graphical representation of a possible system analysis.

FIG. 3 shows, for example, a (hypothetically assumed) frequency distribution of the system quality values with respect to the grouping criterion network operator. For each network operator NB1 to NB5, a column is shown the height of which corresponds to the system quality value of this network operator NB1 to NB5. The values are ordered in accordance with the number of network operator NB1 to NB5.

It must be noted that the frequency distribution shown is only one of an enormous number of possible frequency distributions with respect to this grouping criterion.

Depending on the choice of weighting factors of the event weighting vectors or of the module weighting vector, very detailed information can be extracted from the database 11. In the text which follows, three examples of this are given. In each example, the data from the first module 12.1 with respect to the assessment criterion call end, from the second module 12.2 with respect to speech quality and from the third module 12.3 with respect to coverage are evaluated. The protocol parameters taken into consideration and their sequences with respect to call end are assumed to be, e.g., signal level, bit error rate, radio channel and handover.

First example: both the weights of the event weighting vectors 15.1 to 15.9 and those of the module weighting vector 19 are all greater than zero. In this case, the frequency distribution of FIG. 3 shows a comparison of the qualities of the overall mobile radio telephone systems of the individual network operators NB1 to NB5.

Second example: the weights of the event weighting vectors 15.1 to 15.9 are all greater than zero but the weights of the module weighting vector 19 are all zero except that for the call end module 12.1. The frequency distribution of FIG. 3 shows in this case an overall comparison of the qualities of all call ends of the individual network operators NB1 to NB5.

Third example: all weights of the event weighting vectors 15.1 to 15.9 are equal to zero except that for the signal level. All weights except that for the call end module 12.1 of the module weighting vector 19 are also equal to zero. The frequency distribution of FIG. 3 shows a detailed comparison of the quality of all call ends of the individual network operators NB1 to NB5 which are attributable to too low a signal level in this case.

It is clear that an immense amount of evaluations are possible due to the plethora of conceivable weighting vectors. It is also possible, therefore, to have the assessment of a mobile radio telephone system performed automatically by an evaluating unit (not shown) and not to leave this to a system engineer by means of the graphical representations. The evaluating unit can send, for example, correction messages to the functional units affected or display a list of faults found via an output unit to the system engineer. He can then take the required measures (e.g. replace a defective control circuit or load correct configuration data or a correct program). It is also possible for the system engineer initially to act independently during the analysis and then to be supported by the system in the refinement and error localization.

Figure 4:
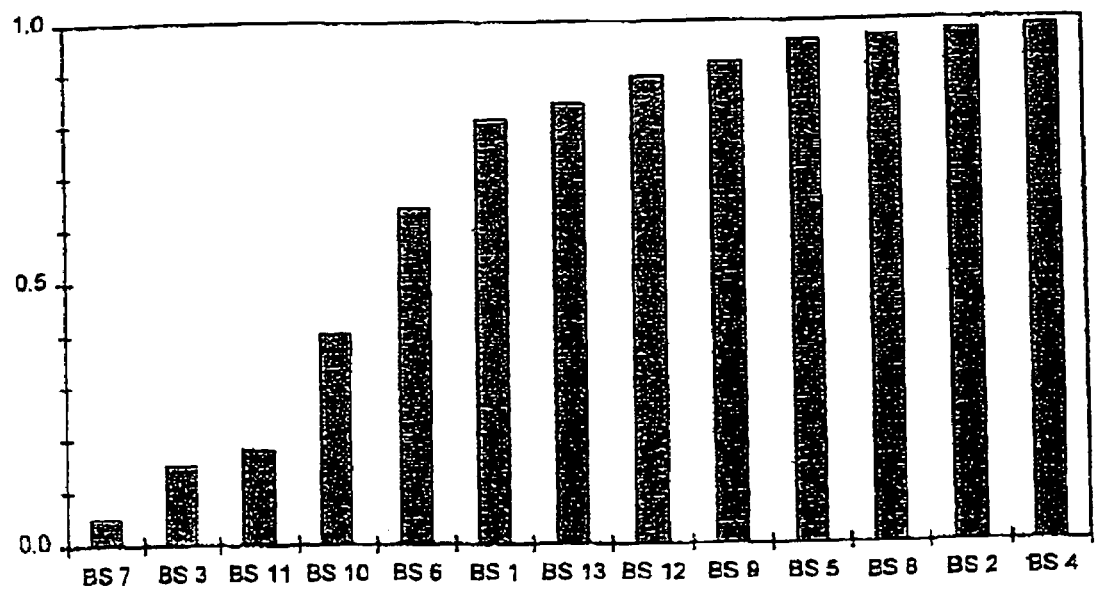
FIG. 4 a diagrammatic, graphical representation of a further system analysis.

FIG. 4 shows another frequency distribution (also hypothetically assumed) of the system quality values with respect to the grouping criterion base station. For each base station BS1 to BS13, one column is shown the height of which corresponds to the system quality value of this base station BS1 to BS13. However, the values are not ordered in accordance with the number of the base station BS1 to BS13 but in accordance with the respective system quality value. This makes it possible to see at a glance the distribution of the quality values corresponding to the required evaluation, what the general quality level looks like and where improvements are urgently necessary.

Here, too, it holds true that the frequency distribution shown is only one possibility from an enormous selection of frequency distributions which is possible in accordance with the selected weighting vectors.

The examples chosen were deliberately very simple. However, it can be easily seen that the method is quite generally suitable for an analysis and assessment of a mobile radio telephone system of any required detail and thus for uncovering fault causes and for automated locating of system defects.

In summary it must be stated that the method according to the invention and the corresponding arrangement make it possible to analyze a mobile radio telephone system and to assess its quality so that it can be selectively improved.

The invention has the following advantages:

In principle, the method is programmable and expandable. It can grow with increasing level of knowledge of the system provider. It is also possible to include new findings of the network operator.

System analysis and any subsequent fault finding and elimination of causes is very rapid. For each hour of a test run, the analysis time is within the range of seconds (and not of hours).

It is possible to assess the quality of an entire system or of any part thereof.

However, it is also possible to find individual problems in individual connections even with a very large volume of data and a very low error rate of the system.

All problems known to the experts are rapidly identified. New problems which have never occurred before can be detected and selectively examined manually.

What is claimed is:

1. A method for the automated analysis of a mobile radio telephone system, in which:
   a) a multiplicity of test connections are established between two terminals, particularly a mobile terminal and a stationary or mobile terminal, as part of a test phase, and
   b) a plurality of protocol parameter values are acquired during the test phase, characterized in that
   c) selected protocol parameter values are stored as record in a database with a suitable structure,
   d) the stored protocol parameter values are evaluated by means of a plurality of modules, a module being used for evaluating the protocol parameter values with respect to an assessment criterion,
   e) for each module, a module quality value is calculated as mean value of a plurality of event quality values, the event quality values representing a measure of quality for in each case one particular event type,
   f) a system quality value is calculated from the module quality values for the analysis of the mobile radio telephone system.

2. The method as claimed in claim 1, characterized in that the protocol parameters acquired comprise internal and/or external system protocol parameters, signaling messages being considered to be internal system protocol parameters and values measured from the outside being considered as external system protocol parameters.

3. The method as claimed in claim 2, characterized in that at least a speech quality, a duration for establishing the test connection and location, time, speed and direction of movement of the mobile terminal are acquired as external system protocol parameters.

4. The method as claimed in claim 1 or 2, characterized in that a record is provided with a time stamp and allocated to a corresponding group of records in accordance with a predetermined grouping criterion.

5. The method as claimed in claim 4, characterized in that the system quality values are correlated with one another with respect to various grouping criteria.

6. The method as claimed in claim 1, characterized in that, for each module, at least one event table is generated in that a search is made in the database for predetermined protocol parameter values identifying a particular event or for combinations of protocol parameter values and the corresponding records are wholly or partially stored in the event tables.

7. The method as claimed in claim 6, characterized in that, for each event found, the time and a selectable or predetermined leading and/or trailing time is determined and, for these events, relevant data of other events located within the leading time and trailing time are also picked out of the database, are stored in the event tables and the events found are classified on the basis of the data of these relevant events.

8. The method as claimed in either of claims 6 and 7, characterized in that the event quality value is calculated for an event in that
   a) a numerical value is allocated to each signaling message or sequence of signaling messages,
   b) an average record is calculated from the records of all events with the same classification in that a mean value is calculated for each protocol parameter value or, respectively, for each numerical value of the signaling messages,
   c) an event vector is formed from the mean values of the average record for each event, and
   d) the event vector is subjected to a scalar multiplication by a predetermined event-specific weighting vector.

9. The method as claimed in claim 1, characterized in that the system quality value is calculated with respect to a grouping criterion by a scalar multiplication of a module quality vector, the components of which are the module quality values of the individual modules, by a module weighting vector, the module weighting vector being dependent on the grouping criterion.

10. The method as claimed in claim 1, characterized in that the system quality values are displayed graphically, particularly as a histogram.

11. An analysis arrangement for carrying out the method as claimed in claim 1, characterized in that the analysis arrangement comprises a conventional, public mobile radio telephone network, at least two terminals for establishing the test connections, at least one measuring device for acquiring the protocol parameter values and an evaluating device with a database for storing selected protocol parameter values as records and an evaluating unit for evaluating the records, the evaluating unit exhibiting a number of modules for calculating in each case one module quality value with respect to an assessment criterion as mean value of a plurality of event quality values which in each case represent a measure of quality for a particular event type, and means for calculating a system quality value as weighted sum of the individual module quality values.

12. An evaluating device for an analysis arrangement as claimed in claim 11, characterized in that it comprises means for importing acquired protocol parameter values, means for storing selected protocol parameter values as records and an evaluating unit, the evaluating unit exhibiting a number of modules for calculating in each case one module quality value with respect to an assessment criterion as mean value of a plurality of event quality values which in each case represent a measure of quality for a particular event type, and means for calculating a system quality value as weighted sum of the individual module quality values.

* * * * *